(12) United States Patent
Shukunami et al.

(10) Patent No.: US 7,296,940 B2
(45) Date of Patent: Nov. 20, 2007

(54) OPTICAL FIBER CONNECTING PORTION STRUCTURE AND LIGHT MONITOR APPARATUS

(75) Inventors: Norifumi Shukunami, Kawasaki (JP); Hiroyuki Furukawa, Kawasaki (JP); Keiko Sasaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/583,107

(22) Filed: Oct. 19, 2006

(65) Prior Publication Data

US 2007/0036499 A1 Feb. 15, 2007

Related U.S. Application Data

(63) Continuation of application No. PCT/JP2004/005793, filed on Apr. 22, 2004.

(51) Int. Cl.
G02B 6/255 (2006.01)
G02B 5/02 (2006.01)

(52) U.S. Cl. .............. 385/96; 385/99; 385/48; 385/141; 427/163.1; 427/163.2

(58) Field of Classification Search .......... 385/42, 385/43, 44, 45, 46, 95, 96, 97, 98, 99, 126, 385/128, 141, 48; 427/163.1, 163.2
See application file for complete search history.

(56) References Cited

U.S. PATENT DOCUMENTS 5,022,735 A * 6/1991 Dahlgren ............... 385/99

| | | | | |
|---|---|---|---|---|
| 6,481,903 B1* | 11/2002 | Varma et al. | ............ | 385/99 |
| 6,535,671 B1* | 3/2003 | Poole | ............ | 385/48 |
| 6,602,601 B2* | 8/2003 | Fewkes et al. | ............ | 428/378 |
| 7,029,187 B2* | 4/2006 | Chapman et al. | ............ | 385/96 |
| 2005/0158001 A1* | 7/2005 | Fabian et al. | ............ | 385/128 |
| 2007/0036499 A1* | 2/2007 | Shukunami et al. | ............ | 385/128 |

FOREIGN PATENT DOCUMENTS

| JP | 54-11753 | 1/1979 | ............ 385/95 X |
| JP | 59-184313 | 10/1984 | ............ 385/95 X |
| JP | 4-93904 | 3/1992 | ............ 385/95 X |
| JP | 10-73729 | 3/1998 | ............ 385/95 X |
| JP | 10-224304 | 8/1998 | ............ 385/95 X |
| JP | 2001-343548 | 12/2001 | ............ 385/95 X |

OTHER PUBLICATIONS

International Preliminary Report on Patentability for corresponding Application No. PCT/JP2004/005793 dated Nov. 2, 2006.

* cited by examiner

*Primary Examiner*—Brian M. Healy
(74) *Attorney, Agent, or Firm*—Staas & Halsey LLP

(57) ABSTRACT

An optical apparatus of the invention has a fusion splice portion where respective ends of two optical fibers each having a core, a cladding, and a UV coat portion provided on the outside of the cladding are fusion spliced, and a re-coat portion which re-coats a portion where the UV coat portion is removed in the vicinity of the fusion splice portion is formed using a material capable of absorbing light radiated from the fusion splice portion. As a result light which is radiated from the fusion splice portion can be reliably prevented from coupling into another optical fiber adjacent to an outside of the re-coat portion.

15 Claims, 6 Drawing Sheets

OPTICAL FIBER CONNECTING PORTION STRUCTURE AND LIGHT MONITOR APPARATUS

This application is a continuation of PCT/JP04/005793, filed on Apr. 22, 2004.

BACKGROUND OF THE INVENTION

1. Field of the Invention

The present invention relates to a structure of a connecting portion of a fusion spliced optical fiber, and to a light monitor apparatus for monitoring the power of optical signals propagated along an optical fiber, and in particular relates to an optical fiber connecting portion structure, and a light monitor apparatus directed to light radiated from a fusion splice portion.

2. Description of the Related Art

Optical fibers have been developing as a medium for transmitting optical signals. As this medium there is for example a silica glass fiber and a plastic fiber which are used in optical communication systems. In optical communication systems, these are used in all kinds of optical parts constituting systems such as transmission lines. More specifically, there is for example; a laser diode (LD) which constitutes a signal light source, a photodiode (PD) which constitutes an optical receiver, an optical coupler which branches one part of the light, an optical switch which switches optical paths, a wavelength combining and branching filter used in wavelength multiplexing and demultiplexing of the optical signal, an optical isolator which transmits light in one direction, an optical filter which filters the light, and an optical amplification fiber which constitutes an optical amplifying medium. In order to assemble together these plurality of optical parts and complete an optical module of an optical modulator, or an optical amplifier, or the like, connection of the optical fibers is necessary.

General connection methods for optical fibers include for example, a method of physically connecting, and a fusion splice method which connects by heating a glass base material to a high temperature and melting. In the physical connection method, an optical fiber is reinforced with a ferrule of for example zirconia, glass, or metal, and connected using an adapter. In the fusion splice method, an electrical discharge is produced by an electrode, and the fibers are connected during the discharge, to thereby perform a fusion splice. A fusion splice apparatus which uses such a method is being put to practical used.

In general, in a silica glass fiber, in order to prevent breaking due to the glass surface being damaged, a UV coat formed using an ultraviolet ray (UV) curing resin is applied. Therefore, at the time of the fusion splice operation, this UV coat is temporarily removed, and the fusion splice performed, and after splicing, the connecting portion is again protected using a heat shrinkable tube or the like. Presently, a re-coat technique is adopted which again covers the temporarily removed UV coat to the same thickness using the UV curing resin (for example refer to Japanese Unexamined Patent Publication No. 2001-343548 and Japanese Unexamined Patent Publication No. H10-73729). This re-coat technique is an effective means in high density installing of optical fibers and connecting portions. The UV curing resin used in the abovementioned re-coat technique, is also used in a wide range of fields other than as a coating material for optical fiber, such as for example a lens forming material or optical adhesive, an adhesive for sticking of optical disks, a hard coat for LCD plastic films, a resin for three dimensional solid shapes, and so on. The UV curing resin as is apparent from the use application, has superior transmissivity with respect to light of visible light (480 to 800 nm) being wavelengths above that of UV rays (200 to 400 nm), and light of wavelengths (800 to 1650 nm) used in optical communication, Incidentally, at the connecting portion of an optical fiber which is fusion connected by the above described conventional method, joint loss occurs due to eccentricity of the core, or mismatch of the mode field diameter. For example, joint loss in homogenous optical fibers is around 0.1 dB. Therefore, for example as shown in FIG. 7, at a fusion splice portion S of the optical fiber, due to the abovementioned joint loss, a part of an optical signal L1 propagated along a core 101 is radiated from the core 101 to a cladding 102. The light L1' radiated to the cladding 102 is propagated along the optical fiber as a cladding mode. Then if another optical fiber is adjacent to the optical fiber in which the cladding mode is being propagated, a phenomena occurs where the light L1' of this cladding mode leaks in to the other optical fiber.

FIG. 8 is an example of a measurement system which evaluates the proportion of coupling of light of the cladding mode with another optical fiber (cross talk), in the case where a fusion splice portion of an optical fiber is adjacent to another optical fiber. In this measurement system, as a light source 200, two types of light source having for example a wavelength of 980 nm and a wavelength of 1480 nm are used. Here, an intensity P1 [dBm] of the light which is propagated along an optical fiber F1 with a re-coat portion 104 which is transparent with respect to the light output from the light source 200, formed in the vicinity of a fusion splice portion S, is measured by an optical power meter 201, and an intensity P2 [dBm] of the light of a cladding mode coupled with another optical fiber F2 adjacent to the fusion splice portion S of the optical fiber F1, is measured with an optical power meter 202, and based on each of the measurement results, a cross talk amount [dB]=P1 [dBm]–P2 [dBm] is obtained. For the optical fiber F2 which couples the light of the cladding mode, a distance from the fusion splice portion S to the optical power meter 202 is L [cm].

FIG. 9 shows the measurement results related to the distance L [cm] and the cross talk amount [dB] in the measurement system of FIG. 8. In the range of L=5 to 30 cm, it is seen that with light of a wavelength of 980 nm, 50 to 67 dB of cross talk is produced, and with light of a wavelength of 1480 nm, 50 to 53 dB of cross talk is produced. Regarding these cross talk amounts, for example assuming a ratio of pumping light power to signal input power in the optical amplifier, then this corresponds to a level which leads to deterioration in the optical SN ratio.

As one method for preventing the occurrence of such cross talk at the fusion splice portion of the optical fiber, for example it is considered to use an optical fiber in which for example as shown at the top of FIG. 10, the UV coating has been subjected to coloring. However, also for an optical fiber in which the UV coating has been subjected to coloring, in the case where as shown at the bottom of FIG. 10, the fusion splice portion S' is re-coated, if the conventional high transmissivity UV curing resin is used as the material of the aforementioned re-coat portion 104', there is the possibility that the light radiated from the fusion splice portion S of the adjacent optical fiber will leak in.

FIG. 11 is a diagram showing a configuration example of a common optical amplifier. In this configuration example, pumping light output from a pumping light source (LD) 301, is supplied to an erbium doped fiber (EDF) 300 via a WDM coupler 302. Furthermore, a part of input light from an input terminal IN which is applied to the EDF 300 via an optical isolator 303 and the WDM coupler 302, is branched by a branching coupler 305, and monitored by an optical receiver 306, and a part of the output light from the EDF 300 which is transmitted to an output terminal OUT via an optical fiber 304 is branched by a branching coupler 307, and monitored by an optical receiver 308.

The above respective constituent components of the common optical amplifier, are each connected by means of an optical fiber having a fusion splice portion S. The constituent components and the connection optical fiber are modularized in an installation state as shown for example in the schematic diagram of FIG. 12. In such an installation state, for example in the case where the fusion splice portion S of the optical fiber between the pumping light source 301 and the WDM coupler 302, and the fusion splice portion S of the optical fiber between the branching coupler 305 and the optical receiver 306 are adjacent, a part of the pumping light leaks in to the input module side via the fusion splice portion S, so that there is the possibility that the optical SN ratio of the input signal light monitored by the optical receiver 306 is deteriorated. More specifically, for example if the input optical power to the optical amplifier is −30 dBm, and the loss of the branching coupler 305 is 13 dB, the power of the input monitor light which reaches to the input light monitoring optical receiver 306 becomes −43 dBm. At this time, if the power of the pumping light is 20 dBm, and the cross talk amount between the respective optical fibers on the pumping light side and the input monitor light side is 50 to 60 dB, pumping light of −40 to −30 dBm leaks in to the optical receiver 306. Consequently, a leak in component of pumping light with a larger power than that of the input monitor light is input to the optical receiver 306. As a result deterioration occurs in the monitor accuracy of the input light to the optical receiver.

An imperfect alignment splice technique which intentionally produces a loss in the fusion splice portion of the optical fiber, is also being put to practical use. If this imperfect alignment splice technique is used, then a loss of approximately 3 dB can be easily produced. In the case where this imperfect alignment splice technique is applied, then even more light is propagated along the cladding mode, and there is the possibility of this leaking in to other optical fibers, and an even greater deterioration in the optical SN ratio occurring.

On the other hand, regarding the light radiated from the aforementioned fusion splice portion S of the optical fiber, considering this from another view point, it is also possible to use this as monitor light or the like for monitoring the power of the signal light propagated along the optical fiber. However, so far there has not yet been a proposal related to a specific configuration for such a light monitor which actively uses the light radiated from the fusion splice portion S.

SUMMARY OF THE INVENTION

The present invention addresses the abovementioned points with a first object of realizing an optical fiber connecting portion structure which can reliably prevent coupling of light radiated from a fusion splice portion into another optical fiber. Furthermore, a second object is to provide a small size light monitor apparatus of a simple structure which uses light radiated from a fusion splice portion.

Therefore, the optical fiber connecting portion structure of the present invention comprises: a fusion splice portion where respective ends of two optical fibers each having a core, a cladding, and a coated portion provided on the outside of the cladding are fusion spliced; a re-coat portion which re-coats a portion where the coated portion is removed in the vicinity of the fusion splice portion; and a radiation light coupling prevention portion which prevents coupling of radiation light of light propagating along the core which is radiated to the cladding side when passing through the fusion splice portion, into another optical fiber adjacent to an outside of the re-coat portion.

In such an optical fiber connecting portion structure, regarding the light propagating along the core, at the time of passing through the fusion splice portion, one part thereof is radiated to the cladding of the core exterior. However, this radiated light is prevented from propagating to the exterior of the re-coat portion by the radiation light coupling prevention portion. Consequently, even if another optical fiber is adjacent to the outside of the re-coat portion, coupling of the radiation light from the fusion splice portion into the other optical fiber is avoided.

As one aspect of the abovementioned radiation light coupling prevention portion, the re-coat portion may be formed using a material which absorbs the radiation light. Furthermore, as another aspect, an outer peripheral surface of the re-coat portion may be formed to give a shape which is capable of diffuse reflecting the radiation light. Moreover, as an other aspect, an outer peripheral surface of the re-coat portion which is transparent with respect to the radiation light, may be coated with a material which absorbs the radiation light.

The light monitor apparatus of the present invention is an apparatus which monitors the power of light propagated along an optical fiber having a core and a cladding, and comprises a photodetector which receives radiation light of the light propagated along the core which is radiated to the cladding side when passing through a fusion splice portion existing on the optical fiber, and is characterized in that it detects a power of the light propagated along the optical fiber based on a photoelectric current produced by the photodetector.

In a light monitor apparatus of such a construction, by using the light radiated from the fusion splice portion, the power of light propagated along the optical fiber can be monitored, by simply providing a photodetector.

Other objects, features and advantages of the present invention will become apparent from the following description of embodiments, in conjunction with the appended drawings.

DESCRIPTION OF THE PREFERRED EMBODIMENTS

Hereunder is a description of a best mode for implementing an optical fiber connecting portion structure and a light monitor apparatus of the present invention, with reference to the appended drawings. Similar reference symbols throughout all the drawings denote the same or equivalent parts.

Figure 1:
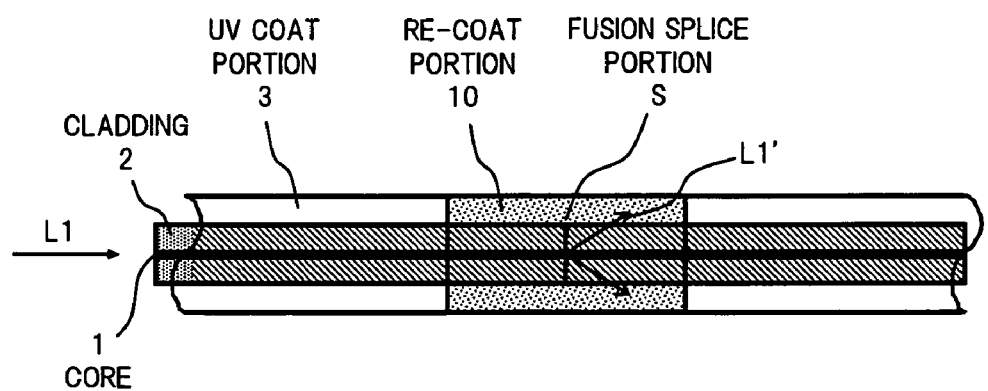
FIG. 1 shows a first embodiment of an optical fiber connecting portion structure according to the present invention.

FIG. 1 shows a first embodiment of an optical fiber connecting portion structure according to the present invention.

In FIG. 1, the optical fiber connecting portion structure of the present embodiment has a fusion splice portion S where respective ends of two optical fibers each having a core 1, a cladding 2, and a UV coat portion (UV coat) 3 are fusion spliced, and is characterized in that, as a re-coat portion 10 formed on a portion where the UV coat portion 3 has been removed for fusion splicing, a material capable of absorbing light radiated from the fusion splice portion S is used. The material (re-coat material) used for the re-coat portion 10, is realized for example by mixing a coloring material with a UV curing resin. The coloring material mixed with the UV curing resin is preferably one with a low light absorption in the wavelength region of the UV rays (200 to 400 nm), so as not to disturb the UV light hardenability.

Figure 2:
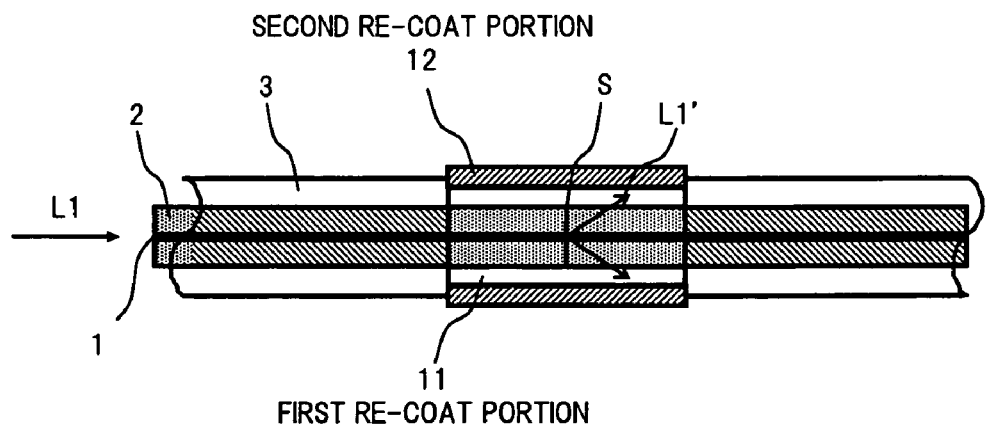
FIG. 2 shows a modified example of the first embodiment.

For the abovementioned coloring material, to explain more specifically, general coloring materials can be roughly divided into pigments and dye stuffs. Furthermore, the pigments can be classified into inorganic pigments, and organic pigments. For example, organic pigment carbon black is known to show extremely large absorbing properties. However, since the absorption amount in the UV region is also large, there is the possibility of occurrence of portions which are not completely cured in the interior of the UV curing resin in which carbon black has been mixed. In such a case, for example as shown in FIG. 2, execution of a double re-coat is effective in which, after first forming a first re-coat portion 11 using a UV curing resin in which carbon black has not been mixed, a second re-coat portion 11 is formed using a UV curing resin in which carbon black has been mixed. As the inorganic pigment mixed in the UV curing resin in the present invention, as well as the abovementioned carbon black, for example an inorganic pigment such as titanium oxide, or zinc oxide may be mixed in with the UV curing resin.

Furthermore, as the abovementioned organic pigment, for example a cyanine based pigment, a phthalocyanine based pigment, an azo based pigment, and the like are know as near infrared radiation absorbing pigments. The re-coat portion 10 may be formed using a UV curing resin in which such organic pigments have been mixed.

In the above described optical fiber connecting portion structure, regarding an optical signal L1 propagated along the core 1 surrounded by the cladding 2, a portion thereof is radiated to the cladding on the core exterior due for example to eccentricity of the core in the fusion splice portion S, or mismatch of the mode field diameter. However, radiation light L1' from the fusion splice portion S is absorbed in the re-coat portion 10 (FIG. 1) or in the second re-coat portion 12 (FIG. 2). Therefore, even if there is another optical fiber nearby, a situation where the radiation light L1' from the fusion splice portion S leaks in to the other optical fiber and produces cross talk can be reliably avoided.

Next is a description of a second embodiment of an optical fiber connecting portion structure according to the present invention.

Figure 3:
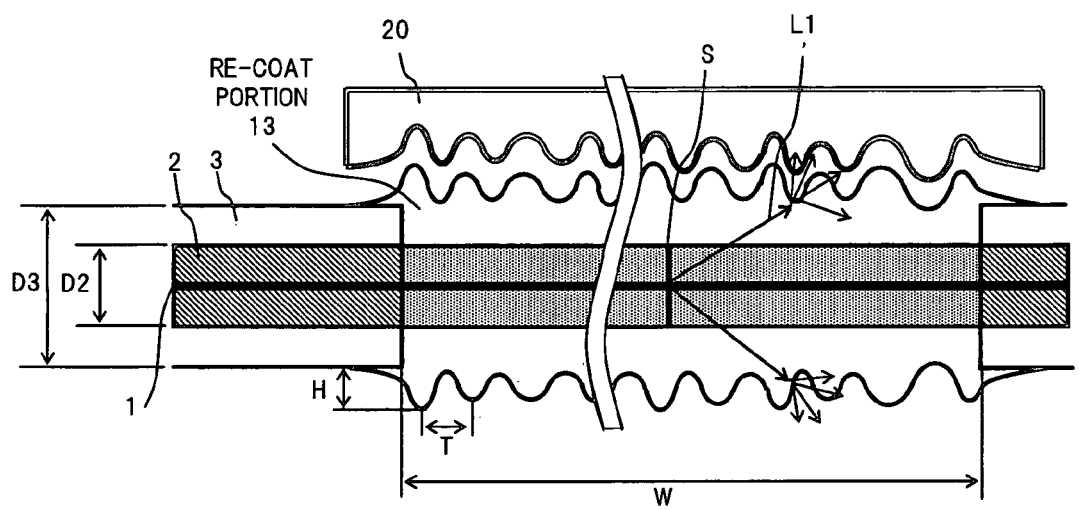
FIG. 3 shows a second embodiment of an optical fiber connecting portion structure according to the present invention.

FIG. 3 shows an optical fiber connecting portion structure of the second embodiment.

In FIG. 3, the optical fiber connecting portion structure of this embodiment has a fusion splice portion S where respective ends of two optical fibers each having a core 1, a cladding 2, and a UV coat portion 3 are fusion spliced, and is characterized in that, a re-coat portion 13 provided with corrugations on the surface is formed on a portion where the UV coat portion 3 has been removed for fusion splicing, so that light L1' radiated from the fusion splice portion S is diffuse reflected.

Regarding the re-coat portion 13, for example in the case where a UV curing resin similar to heretofore is used to re-coat the vicinity of the fusion splice portion S, the re-coat portion 13 is one where a random corrugated shape of several 10s to several 100s times the wavelength of the optical signal L1 propagated along the core 1 is formed on the outer peripheral surface. More specifically, in the case where the surface roughness of the re-coat portion 13 (here the surface roughness is expressed using the sizes H and T of the corrugations shown in FIG. 3) is one or more digits less than the wavelength of the optical signal L1, hardly any of the light radiated from the fusion splice portion S is diffuse reflected by such a corrugated surface. Furthermore, in the case where the surface roughness of the re-coat portion 13 is commensurable with the wavelength of the optical signal L1, and the shape of the corrugations is periodic, a diffraction phenomena arises at such a corrugation surface, and the light is strongly reflected in a specific angular direction. Therefore, in the present embodiment, by making the corrugation sizes H and T of the surface of the re-coat portion 13 an order of 10 to 100 μm, and making the corrugation form thereof a substantially random form, the light radiated from the fusion splice portion S is diffuse reflected by the corrugation surface. As a comparison of the aforementioned corrugation sizes H and T, giving a specific example of the cladding diameter D2, the UV coating diameter D3, and the re-coat length W, the cladding diameter D2 is 125 μm, the UV coating diameter D3 is 250 μm, and the re-coat length W is an order of 10 to 20 mm. However, the optical fiber applicable to the present invention is not specifically limited to the above example.

In forming the re-coat portion 13 having the abovementioned corrugation shape, for example a mold 20 such as shown on the top side of FIG. 3 formed with random corrugations by for example bead blasting or the like, may be used to perform the curing process for the UV curing resin. Furthermore, for the abovementioned mold 20, in order to cure the UV curing resin filled between the optical fibers, preferably a material which is transparent with respect to light of a wavelength range of 200 to 400 nm is used.

According to the optical fiber connecting portion structure as described above, the light L1' radiated from the fusion splice portion S is diffuse reflected by the outer peripheral face of the re-coat portion 13. Therefore, even in the case where another optical fiber is nearby, a situation where the radiation light L' from the fusion splice portion S leaks in to the other fiber can be reliably avoided.

Next is a description of a third embodiment of an optical fiber connecting portion structure according to the present invention.

Figure 4:
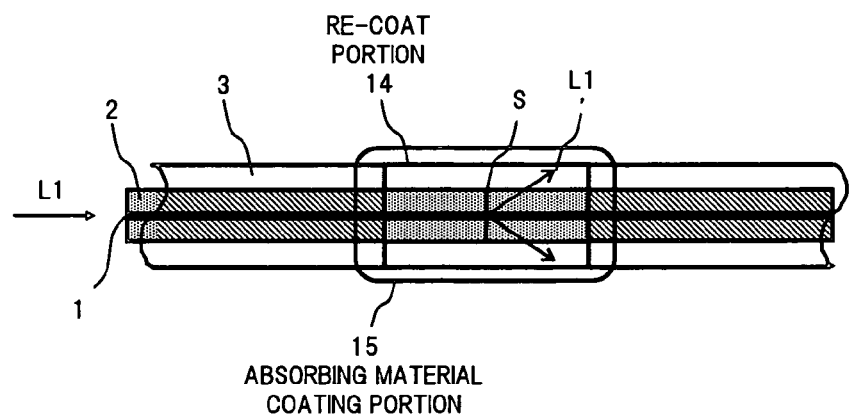
FIG. 4 shows a third embodiment of an optical fiber connecting portion structure according to the present invention.

FIG. 4 shows an optical fiber connecting portion structure of the third embodiment.

In FIG. 4, the optical fiber connecting portion structure of the present embodiment has a fusion splice portion S where respective ends of two optical fibers each having a core 1, a cladding 2, and a UV coat portion (UV coat) 3 are fusion spliced, and is characterized in that, after forming a re-coat portion 14 using a UV curing resin the same as heretofore, on a portion where the UV coat portion 3 has been removed for fusion splicing, an absorbing material coating portion 15 for absorbing the light L' radiated from the fusion splice portion S is formed on the surface of the re-coat portion 14.

The abovementioned absorbing material coating portion 15 is formed for example by using an ink or the like in which a pigment the same as for the case of the first embodiment is mixed in a solvent different to that of the UV hardening resin used in forming the re-coat portion 14, and applying the abovementioned ink over the whole of the surface of the re-coat portion 14 which is transparent with respect to the radiation light L' from the fusion splice portion S. As a specific example of the abovementioned solvent it is possible to use; an aliphatic hydrocarbon (petroleum ether, hexane, heptane, octane), an aliphatic oxygen compound (acetal, alcohols, acetone, ester acetate), an aliphatic nitrogen containing compound (acetonitrile), and aromatic compound (benzene, toluene, xylene, styrene), an aromatic nitrogen containing compound (pyridine), an aliphatic halogen compound (chloroform, methyl chloride, dichloromethane, carbon tetrachloride), an aromatic halogen containing compound (chlorobenzene, benzyl chloride), and the like.

According to the above described optical fiber connecting portion structure, the light L1' radiated from the fusion splice portion S is absorbed by the absorbing material coating portion 15 after passing through the re-coat portion 14. Therefore, even in the case where another optical fiber is nearby, a situation where the radiation light L1' from the fusion splice portion S leaks in to the other optical fiber so that cross talk occurs can be reliably avoided. Furthermore, different to the conventional protection method for the re-coat portion using the heat shrinkable tube, the absorbing material coating portion 15 can be formed to a thickness of 0.1 mm order. Therefore, there is also the effect of being extremely advantageous in regards to optical fiber installation.

Next is a description of an embodiment of a light monitor apparatus according to the present invention.

Figure 5:
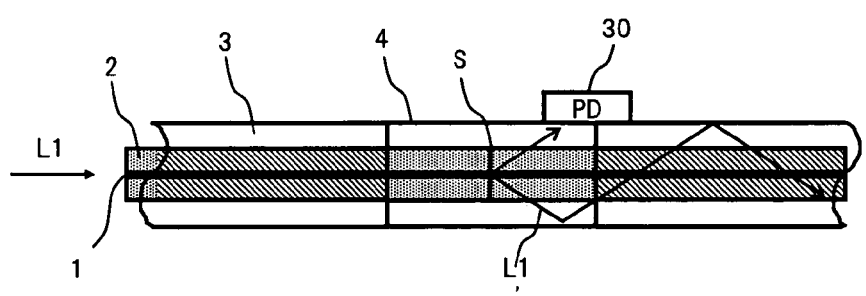
FIG. 5 shows an embodiment of a light monitor apparatus according to the present invention.

FIG. 5 shows a configuration of the embodiment of the light monitor apparatus according to the present invention.

In FIG. 5, the light monitor apparatus of this embodiment, in order to monitor the power of a signal light L1 propagated along an optical fiber having a core 1 and a cladding 2, is provided with a photodetector (PD) 30 on a surface of a re-coat portion 4 which is reached by light L1' radiated from a fusion splice portion S. This photodetector 30 is a general photodetector which receives the light L' which is radiated from the fusion splice portion S and has passed through the re-coat portion 4 formed using the transparent UV curing resin similar to heretofore, and produces a photoelectric current corresponding to the power of this light L1'. Here the photodetector 30 is secured to the optical fiber so that the light receiving surface of the photodetector 30 is positioned on the outer peripheral face of the re-coat portion 4.

In the light monitor apparatus of the above described construction, by receiving the light L1' radiated from the fusion splice portion S, with the photodetector 30, the power of the optical signal L1 propagated along the optical fiber, and corresponding to the value of the photoelectric current output from the photodetector 30, can be easily monitored. Heretofore, in order to monitor the power of the optical signal L1 propagated along the optical fiber, it was necessary to branch a part of the light signal L1 using for example a fiber fusion coupler, or a dielectric multilayer film, or the like, and guide the branch light via an optical fiber or the like to the photodetector. However, according to the abovementioned light monitor apparatus of the present embodiment, by using the light L1' radiated from the fusion splice portion S, the power of the optical signal L1 can be monitored by simply providing the photodetector 30 on the outer peripheral face of the re-coat portion 4. As a result, it is possible to realize a small size light monitor apparatus of only a few parts.

Figure 6:
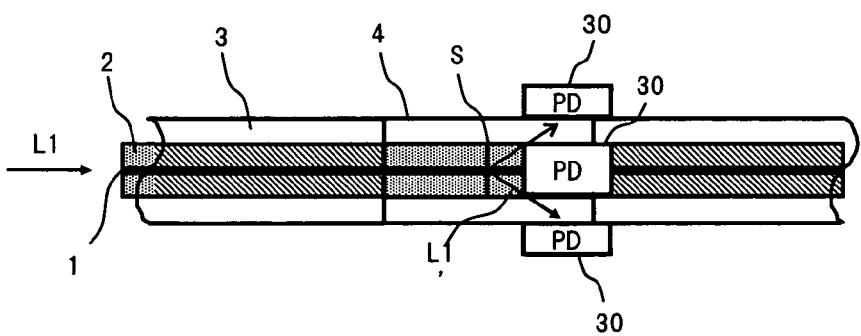
FIG. 6 shows an application example of the light monitor apparatus of FIG. 5.
Figure 7:
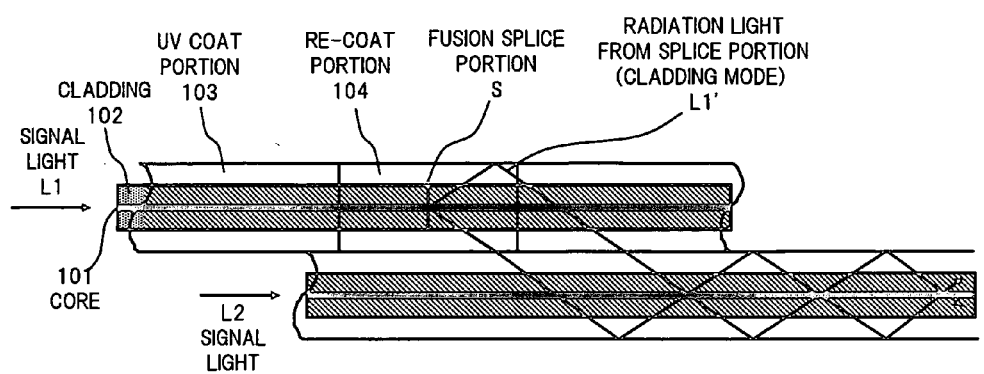
FIG. 7 is a diagram for explaining leakage of cladding mode light into another optical fiber, in a conventional optical fiber connecting portion structure.
Figure 8:
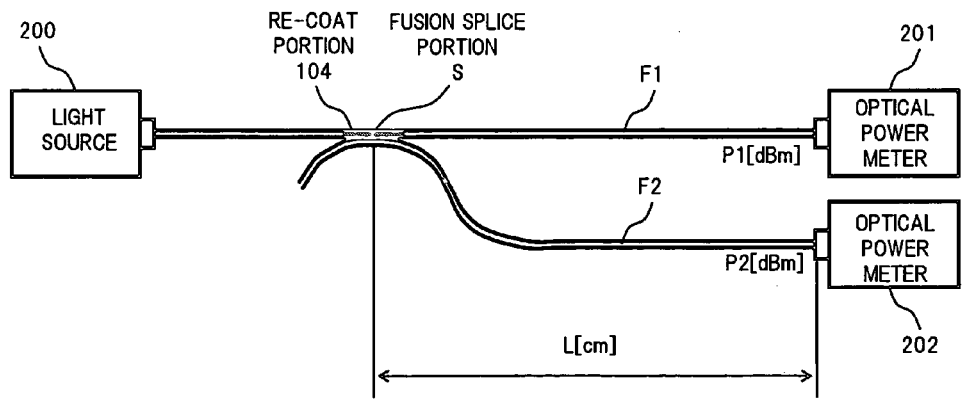
FIG. 8 shows an example of a measuring system for evaluating cross talk of cladding mode light in a conventional optical fiber connecting portion structure.
Figure 9:
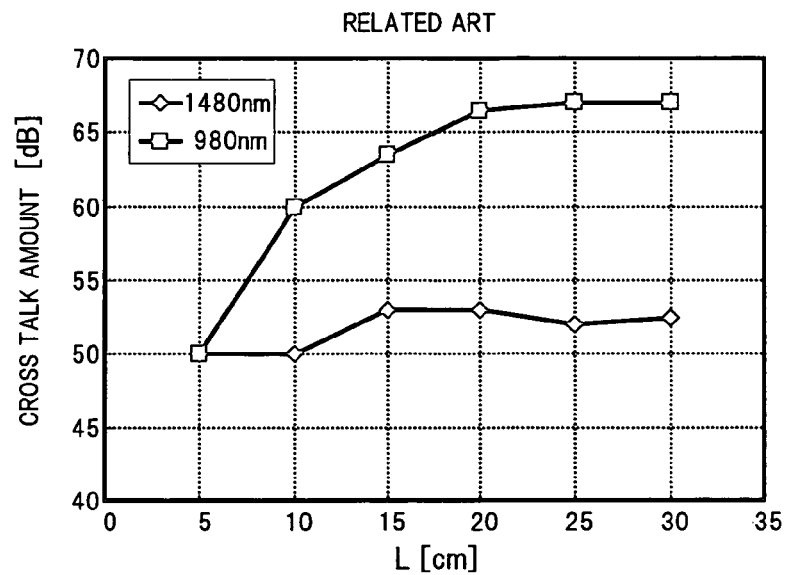
FIG. 9 shows measurement results of a relation between distance and cross talk amount in the measurement system of FIG. 8.
Figure 10:
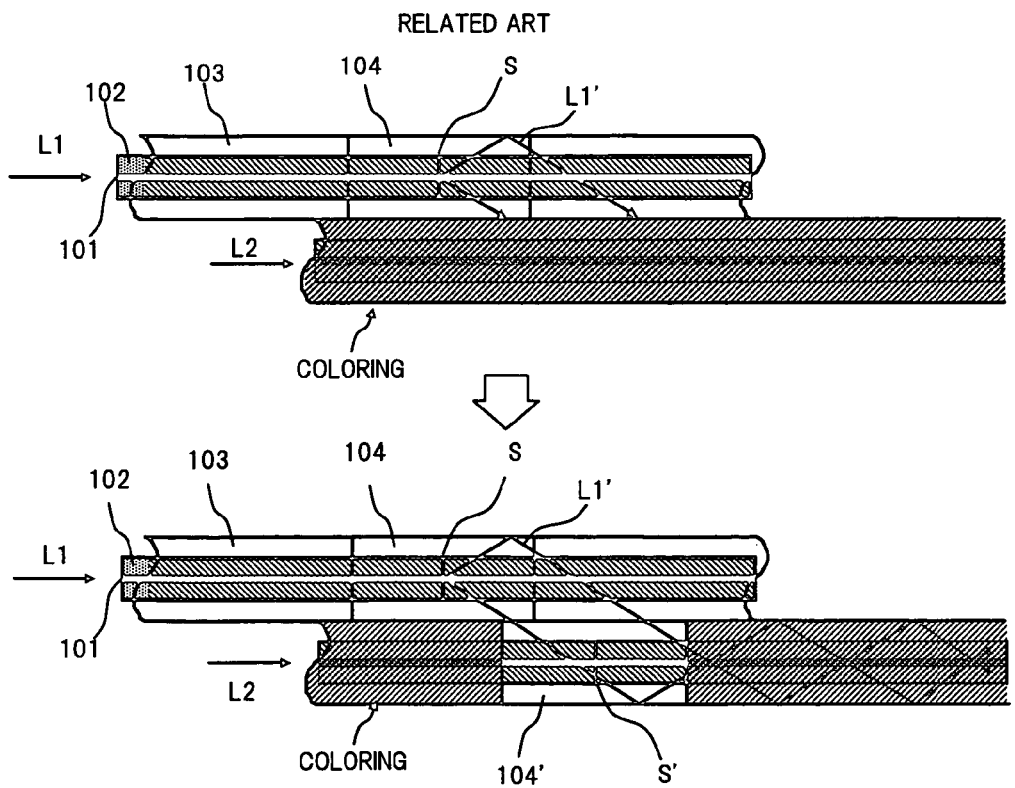
FIG. 10 a diagram for explaining problem points with known technology for preventing the occurrence of cross talk in a conventional optical fiber connecting portion structure.
Figure 11:
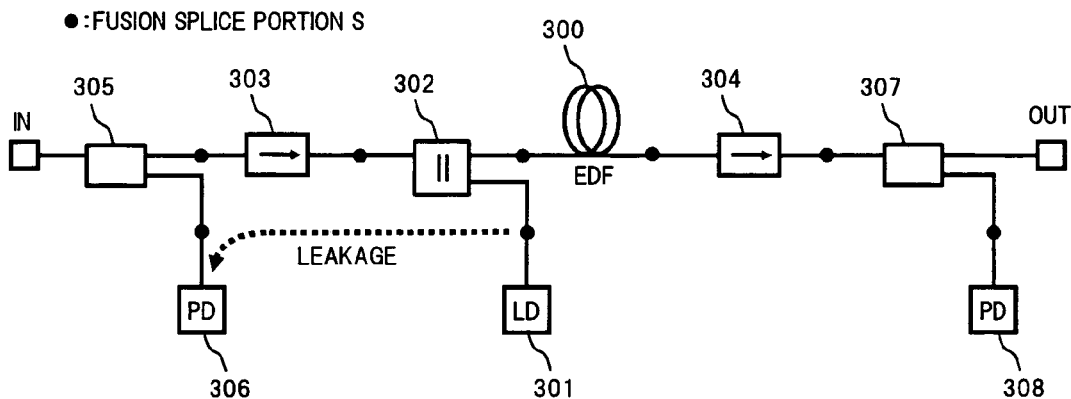
FIG. 11 show a configuration example of a general optical amplifier.
Figure 12:
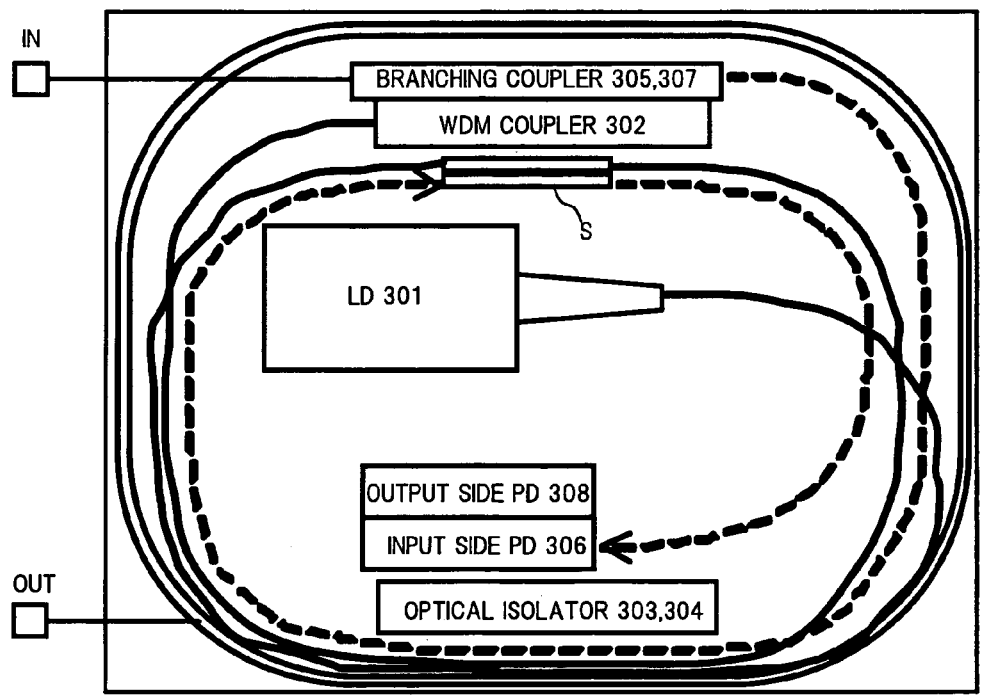
FIG. 12 shows an outline of an installation state of the optical amplifier of FIG. 11.

In the embodiment of the light monitor apparatus, one photodetector 30 is provided on the outer peripheral face of the re-coat portion 4. However for example as shown in FIG. 6, a plurality of photodetectors 30 may be provided around the circumferential direction on the outer peripheral face of the re-coat portion 4. By providing a plurality of photodetectors 30 in this manner, the light radiated from the fusion splice portion S can be received with good efficiency. Furthermore, if a ring type photodetector along the circumferential direction of the outer peripheral face of the re-coat portion 4 can be realized, it is possible to receive the light L1' radiated from the fusion splice portion S with even better efficiency.

Moreover, in the embodiment of the light monitor apparatus, the example is shown where the light receiving face of the photodetector 30 is positioned on the outer peripheral face of the re-coat portion 4. However, the photodetector 30 may be arranged so as to position the light receiving face in the vicinity of the outer peripheral face of the re-coat portion 4. In this case, an application is also possible where a lens which focuses the light radiated from the outer peripheral face of the re-coat portion 4 onto the light receiving face of the photodetector 30, is formed on the outer peripheral face of the re-coat portion 4.

INDUSTRIAL APPLICABILITY

According to the present invention as described above, an optical fiber connecting portion structure can be realized which can reliably prevent coupling of light radiated from the fusion splice portion into another optical fiber. Furthermore, a small size light monitor apparatus can be provided with a simple construction using radiation light from the fusion splice portion. Consequently, the present invention has considerable industrial applicability in diverse fields including optical communication and the like.

What is claimed is:

1. An optical apparatus comprising: a fusion splice portion where respective ends of two optical fibers each having a core, a cladding, and a coated portion provided on an outside of the cladding are fusion spliced; and a re-coat portion which re-coats a portion where said coated portion is removed in the vicinity of the fusion splice portion;

wherein there is provided a radiation light coupling prevention portion which prevents coupling of radiation light of light propagating along said core which is radiated to said cladding side when passing through said fusion splice portion, into another optical fiber adjacent to an outside of said re-coat portion.

2. An optical apparatus according to claim 1, wherein in said radiation light coupling prevention portion, said re-coat portion is formed using a material which absorbs said radiation light.

3. An optical apparatus according to claim 2, wherein said re-coat portion is formed using a material where a coloring material is mixed with an ultraviolet curing resin.

4. An optical apparatus according to claim 3, wherein said coloring material is an inorganic pigment.

5. An optical apparatus according to claim 4, wherein said re-coat portion has a first re-coat portion formed on the outside of said cladding using an ultraviolet curing resin, and a second re-coat portion formed on the outside of said first re-coat portion using a material where carbon black is mixed with an ultraviolet curing resin.

6. An optical apparatus according to claim 3, wherein said coloring material is an organic pigment.

7. An optical apparatus according to claim 1, wherein in said radiation light coupling prevention portion an outer peripheral surface of said re-coat portion is formed to give a shape which is capable of diffuse reflecting said radiation light.

8. An optical apparatus according to claim 7, wherein the outer peripheral surface of said re-coat portion is formed to give a random corrugated shape having a larger surface roughness than a wavelength of light propagated along said core.

9. An optical apparatus according to claim 1, wherein in said radiation light coupling prevention portion, an outer peripheral surface of said re-coat portion which is transparent with respect to said radiation light, is coated with a material which absorbs said radiation light.

10. An optical apparatus according to claim 9, wherein in said radiation light coupling prevention portion, an outer peripheral surface of said re-coat portion which is formed using an ultraviolet curing resin, is coated with a material where a coloring material is mixed with a solvent different to that for said ultraviolet curing resin.

11. An optical apparatus according to claim 10, wherein said coloring material is an inorganic pigment.

12. An optical apparatus according to claim 10, wherein said coloring material is an organic pigment.

13. A light monitor apparatus which monitors a power of light propagated along an optical fiber having a core and a cladding, comprising:

a photodetector which receives radiation light spread away from said core to said cladding, when the light propagated along the optical fiber passes through a fusion splice portion existing on said optical fiber, and which determines a power of the light propagated along said optical fiber based on a photoelectric current produced by said photodetector.

14. A light monitor apparatus according to claim 13, wherein radiation light is received by multiple photodetectors including the photodetector, which are provided outside of said optical fiber.

15. A method of monitoring a power of light propagated along an optical fiber having a core and a cladding, comprising:

receiving radiation light of the light propagated along said optical fiber, which is radiated away from the core to said cladding, when the light passes through a fusion splice portion existing on said optical fiber; and detecting a power of the light propagated along said optical fiber based on a power of the received radiation light.

* * * * *